April 21, 1931.  K. A. BEHNE  1,802,307
SUGAR CANE CUTTER
Filed April 28, 1930
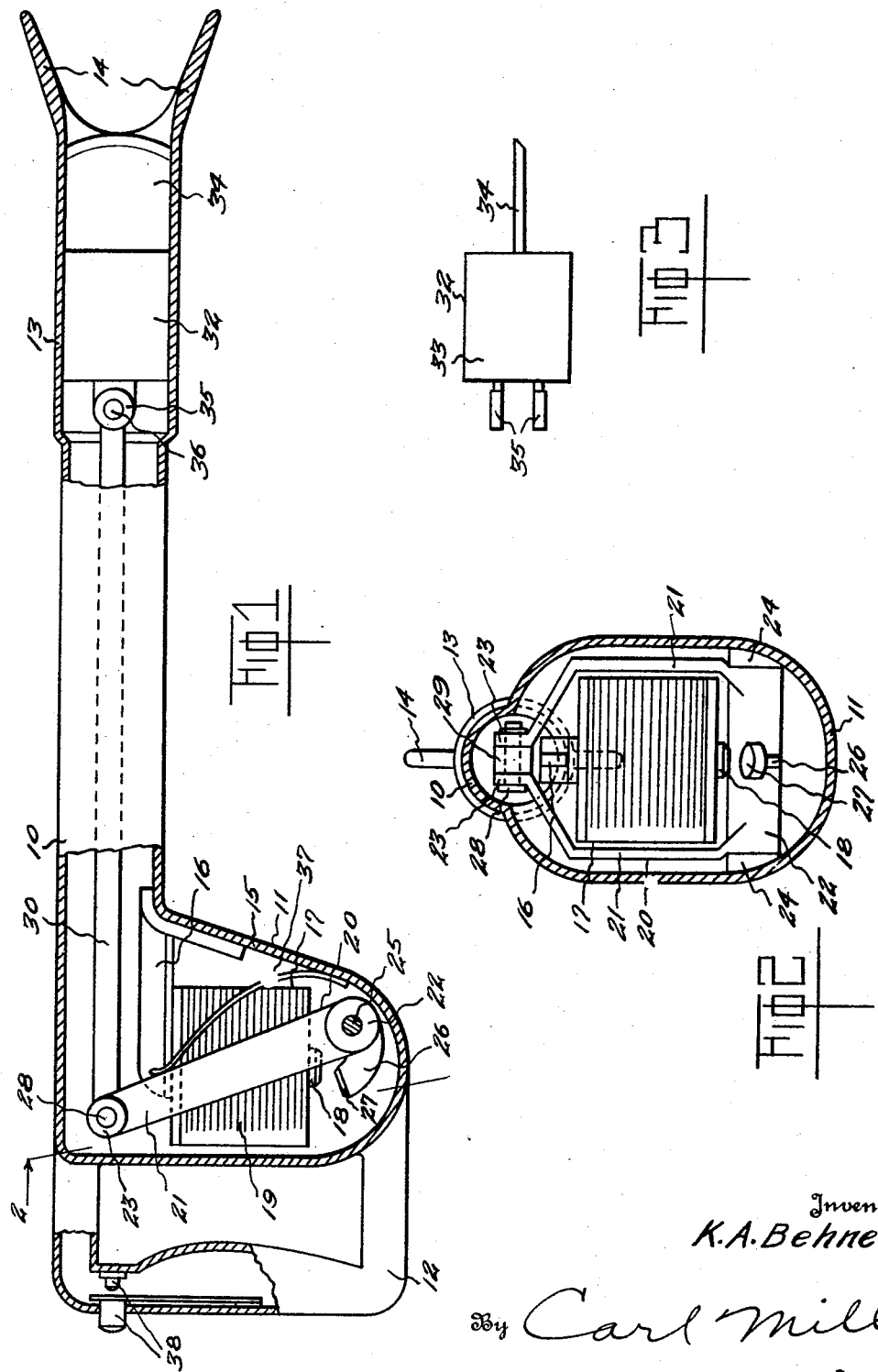
Inventor
K. A. Behne
By Carl Miller
Attorney Patented Apr. 21, 1931

1,802,307

UNITED STATES PATENT OFFICE

KARL A. BEHNE, OF SAN JUAN, PORTO RICO

SUGAR-CANE CUTTER

Application filed April 28, 1930. Serial No. 448,056.

This invention relates to sugar cane cutting devices.

The object of this invention is to design an electrically operated sugar cane cutter adapted to be carried by the operator thereof and easily applied to the stalks of the sugar cane to cut the same.

Other objects of this invention are to so design the electrically operated sugar cane cutter as to possess few moving parts, be efficient in operation, light in weight, positive in its cutting action, and easy and cheap to manufacture.

Other objects of this invention will become apparent as the description thereof given hereunder proceeds, reference being had to the accompanying drawing, wherein:—

Figure 1 is an elevational view partly in section of the sugar cane cutter.

Figure 2 is a cross-sectional view thereof, taken on line 2—2, Figure 1.

Figure 3 is a plan view of the cutting member.

The sugar cane cutter consists essentially of an elongated cylindrical barrel 10 provided at one end thereof with an integral enlarged housing 11 extending substantially at right angles thereto and communicating with the interior of said barrel. Directly to the rear of said housing and vertically and centrally thereof, is a hollow handle 12 which preferably is integral therewith. The other end portion of the barrel 10 is formed with an integral cylindrical guide portion 13 of a slightly enlarged diameter, the purpose of which is to be hereinafter described. Attached or integrally formed with the edge of the guide portion 13 are diametrically opposite, outwardly extending fingers 14 which function to position the sugar cane cutter on the stalk of the cane (not shown).

Rigidly secured in any desired manner to the inner wall 15 of the housing 11 and substantially in alignment with the bottom of the barerl 10 is an L-shaped bracket 16, to which is attached a depending electro-magnet 17. Extending slightly beyond the bottom of the electro-magnet 17 is the iron core 18 thereof, which is adapted to become magnetized as an electric current is allowed to flow through the winding 19, in the manner well known in the art.

Straddling the electro-magnet 17 is a yoke member 20 comprising arms 21, a bight portion 22 and eyes 23. The upper part of the arms 21 carry the eyes 23 and are inclined towards each other, see Figure 2, said eyes being therefore spaced a short distance apart, as shown. The bight portion 22 of the yoke 20 is positioned between two spaced lugs 24 formed on the side walls 15' of the housing 11 adjacent the bottom of said housing and is pivoted thereto by means of the pivot pin 25, in the well known manner. Integral with the bight portion of the yoke 20, centrally thereof and extending upwardly therefrom is an extension or stud 26 provided on its top with a contact member 27, the purpose of which is to be hereinafter described.

Pivotally attached to the eyes 23 of the yoke 20 by means of the pivot pin 28, is one end comprising an eye 29 of a connecting rod 30 which extends longitudinally within the barerl 10, the other end being provided with a similar eye 31 which extends into the guide portion 13 for a very short distance.

Slidably mounted in the guide portion 13 is a cutting member 32, comprising a central cylindrical portion 33, a blade 34 integral therewith at one end thereof and a pair of spaced eyes 35 integral with said portion 33 at the other end thereof. The eye 31 of the connecting rod 30 is placed between the eyes 35 and are pivotally secured together by means of the pivot pin 36.

Attached to the wall 15 of the housing 11 are spaced leaf springs 37 which bear against the arms 21 of the yoke 20 to maintain the cutting member 32 normally within its guide portion 13 and the contact member 27 out of engagement with the bottom of the case 18 of the magnet 17 as clearly disclosed in Figure 1.

Provided in the handle 12 is a trigger switch 38 which through suitable electrical connections (not shown) will energize the magnet 17, when said trigger switch is depressed. As the magnet is energized it will cause the contact member 27 to move upwardly into engagement with the bottom of the core 18 of the magnet, which movement will simultaneously move the yoke 20, connecting rod 30, and cutting member 32 outwardly, to effect a cutting of a stalk of sugar cane when said cutter is placed in an operative cutting position relative to said stalk.

The sugar cane cutter may be designed to operate on any desired cutting stroke under any desired force. A stroke of three inches of the cutting member under a force of five to six pounds has been found satisfactory for the purposes of cutting sugar cane.

While a preferred form of cutting device has been shown the same is nevertheless susceptible of various modifications within the scope of the appended claims given hereunder.

Having thus described my invention, what I claim as new and desire to secure by U. S. Letters Patent is:—

1. A sugar cane cutter comprising a barrel, a housing at one end thereof, a handle on said housing, a guide portion on the other end of said barrel, a reciprocal cutting member in said guide portion, a connecting rod in said barrel pivotally secured at one end thereof to said cutting member, and electrically operated means in said housing and connected to said rod for actuating said cutting member, said means comprising an electro-magnet suspended in said housing, a yoke straddling said magnet, the bight portion thereof being pivotally connected to the bottom portion of said housing, said rod being pivotally connected to the upper ends of said yoke, a stud on the bight portion of said yoke, a contact member on said stud, adapted to be moved into engagement with said electro-magnet when the same is energized and to simultaneously move said yoke and rod to actuate said cutting member.

2. A sugar cane cutter comprising a barrel, a housing at one end thereof, a handle on said housing, a guide portion on the other end of said barrel, a reciprocal cutting member in said guide portion, a connecting rod in said barrel pivotally secured at one end thereof to said cutting member, and electrically operated means in said housing and connected to said rod for actuating said cutting member, said cutting member comprising a cylindrical portion and a blade attached to said cylindrical portion, and a pair of laterally extending fingers on the outer end of said guide portion.

In testimony whereof I affix my signature.

KARL A. BEHNE.